United States Patent
Lu et al.

(10) Patent No.: US 7,865,614 B2
(45) Date of Patent: Jan. 4, 2011

(54) METHOD AND APPARATUS FOR LOAD BALANCING WITH SERVER STATE CHANGE AWARENESS

(75) Inventors: Ying Lu, Lincoln, NE (US); Giovanni Pacifici, New York, NY (US); Malgorzata Steinder, Leonia, NJ (US); Asser Nasreldin Tantawi, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 11/673,866

(22) Filed: Feb. 12, 2007

(65) Prior Publication Data

US 2008/0195755 A1     Aug. 14, 2008

(51) Int. Cl.
    *G06F 13/00* (2006.01)
(52) U.S. Cl. .......... 709/241; 709/223; 370/503; 711/156; 711/100; 711/154; 711/141; 711/146
(58) Field of Classification Search .......... 709/241, 709/228, 226, 225, 232, 233
See application file for complete search history.

(56) References Cited

U.S. PATENT DOCUMENTS

| | | | |
|---|---|---|---|
| 6,970,425 B1 * | 11/2005 | Bakshi | 370/235 |
| 2002/0010783 A1 * | 1/2002 | Primak et al. | 709/228 |
| 2003/0158940 A1 * | 8/2003 | Leigh | 709/226 |

OTHER PUBLICATIONS

U.S. Appl. No. 10/978,944, filed Nov. 1, 2004, Black-Ziegelbein et al.
U.S. Appl. No. 11/106,098, filed Apr. 14, 2005, Gissel et al.

* cited by examiner

*Primary Examiner*—Jude J Jean Gilles
(74) *Attorney, Agent, or Firm*—Yee & Associates, P.C.; Preston J. Young

(57) ABSTRACT

A computer implemented method, apparatus, and computer usable program code for load balancing in a cluster. In response to receiving a notification of an impending state change event in the server, a weight adjustment value for a server is identified to form an identified weight adjustment. An adjusted routing weight for the server is generated using the identified weight adjustment to form a current routing weight for the server. An incoming service request is routed to a selected server in the cluster using current routing weight associated with servers in the cluster.

20 Claims, 12 Drawing Sheets

METHOD AND APPARATUS FOR LOAD BALANCING WITH SERVER STATE CHANGE AWARENESS

BACKGROUND OF THE INVENTION

1. Field of the Invention

The present invention is related generally to a data processing system and in particular to an improved load balancer. More particularly, the present invention is directed to a computer implemented method, apparatus, and computer usable program code for a load balancing feedback controller enhanced by feed-forward control for reacting to server state changes.

2. Description of the Related Art

A computer data center is a physical structure designed to house multiple computing devices, such as application servers. An application server is a computing device connected to a network that is wholly or partially dedicated to running one or more applications. An application is computer software that uses the resources of a computing device to perform a task or service for a user.

A computer data center may include multiple application servers loosely coupled together in a cluster. This cluster of connected servers may be a computer cluster or a server farm. Each application server in a cluster may deploy several applications providing one or more different services to users. An application providing a given service may be replicated on multiple application servers in the cluster. The replication of the application allows multiple requests to access a given application to be handled concurrently by two or more servers. In addition, replication of the application on multiple application servers also allows an application to remain available even if one server providing the application is down or unavailable. However, the various requests to access applications on the cluster need to be managed to enable optimal performance of the applications on the cluster.

Load balancing is a front-end process for managing and assigning work loads to two or more application servers in a cluster to optimize performance of the application and decrease execution time. Load balancing is typically performed by a load balancer. Typically, all requests to access an application on a cluster are routed to a back-end server by the load balancer. The load balancer receives a request for an application, selects a given server to run the application, and distributes the request to the selected back-end application server. The load balancer routes requests for a given application to a given server running that application to achieve similar performance to each request, independent of the particular server that is destined to execute the request. To achieve this result, the load balancer must take into account factors that affect application performance on each server.

The performance provided by a server depends on many factors, including the load on the server, the number of applications deployed on the server, and dynamic changes to the state of the server. The load refers to the amount of work currently being performed by the server. A state change refers to a change in the current operating state of the computing device. A server state change may be either a managed change or an unmanaged change. A managed change is a change that occurs at the direction or control of a user and/or a load balancer. Examples of managed state changes include starting execution of an application or stopping execution of an application. An unmanaged state change is a change that occurs without the control or direction of a user or load balancer. For example, an unmanaged state change may include, but is not limited to, periodic garbage collection, daemons, and/or other background workloads.

The impact of a server state change on the server performance can be quite significant. A server state change should result in the load balancer decreasing the amount of traffic destined to that server. However, currently available load balancers only detect server state changes through the measurement of current server performance. A change in state of a given server is not registered until after the change in state has affected the performance of the given server to a degree that the change in performance is measurable by a performance monitor.

Thus, the detection and reaction to server state changes may be slow and result in degraded application server performance for potentially lengthy periods of time. For example, when a new application begins executing on a given server, the load balancer may not become aware of the state change until the server processing time has already slowed due to the state change. A similar problem may occur when the server returns to its normal state, for example, when execution of the new application ends.

SUMMARY OF THE INVENTION

The illustrative embodiments provide a computer implemented method, apparatus, and computer usable program code for load balancing in a cluster. In one embodiment, a weight adjustment value for a server is identified to form an identified weight adjustment in response to receiving a notification of an impending state change event in the server. An adjusted routing weight for the server is generated using the identified weight adjustment. An incoming service request is routed to a selected server in the cluster based on the adjusted routing weight for each server in the cluster.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
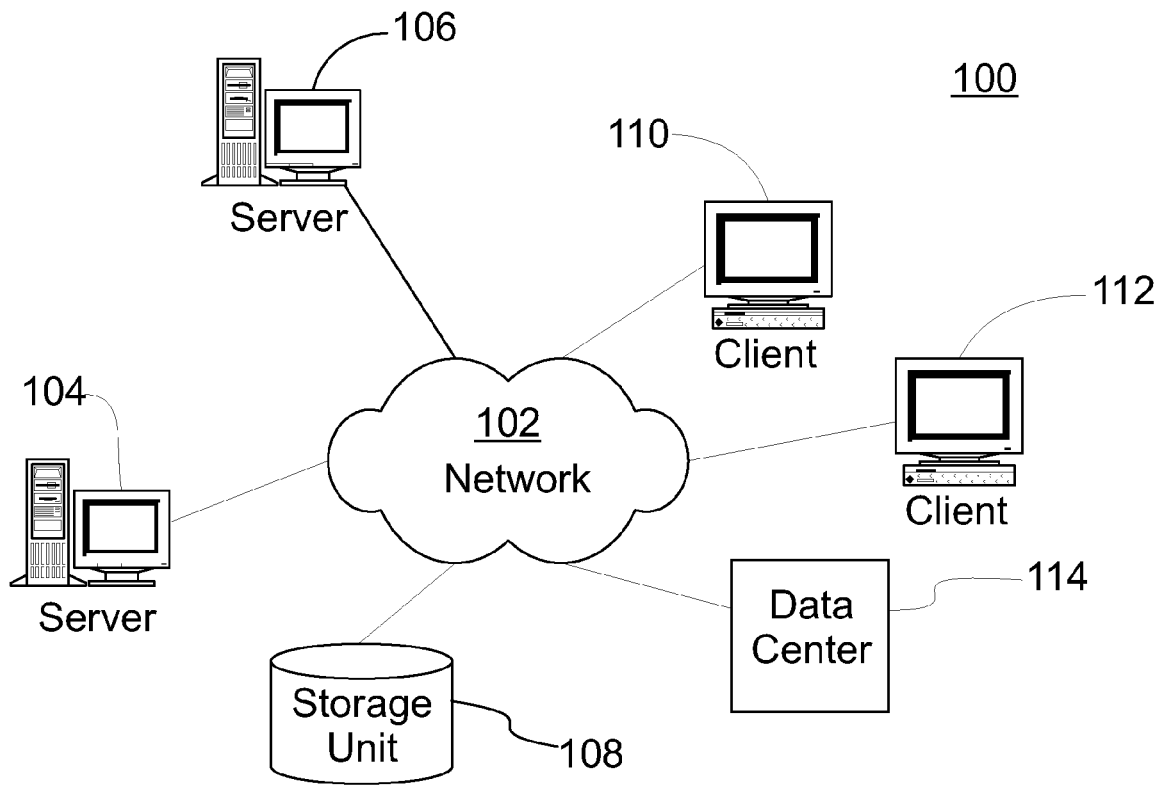
FIG. 1 is a pictorial representation of a network of data processing systems in which illustrative embodiments may be implemented.
Figure 2:
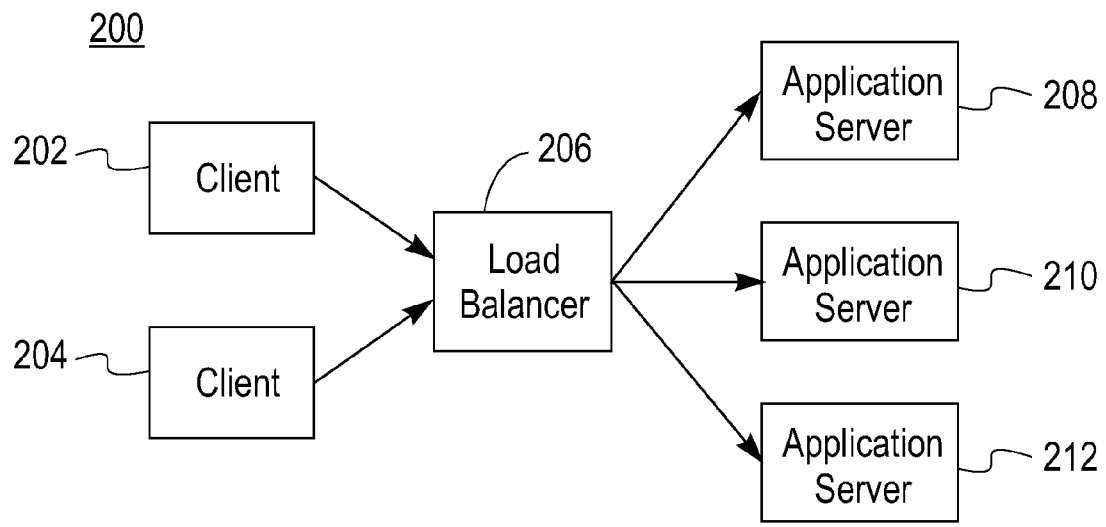
FIG. 2 is a block diagram of a cluster in which illustrative embodiments may be implemented.
Figure 3:
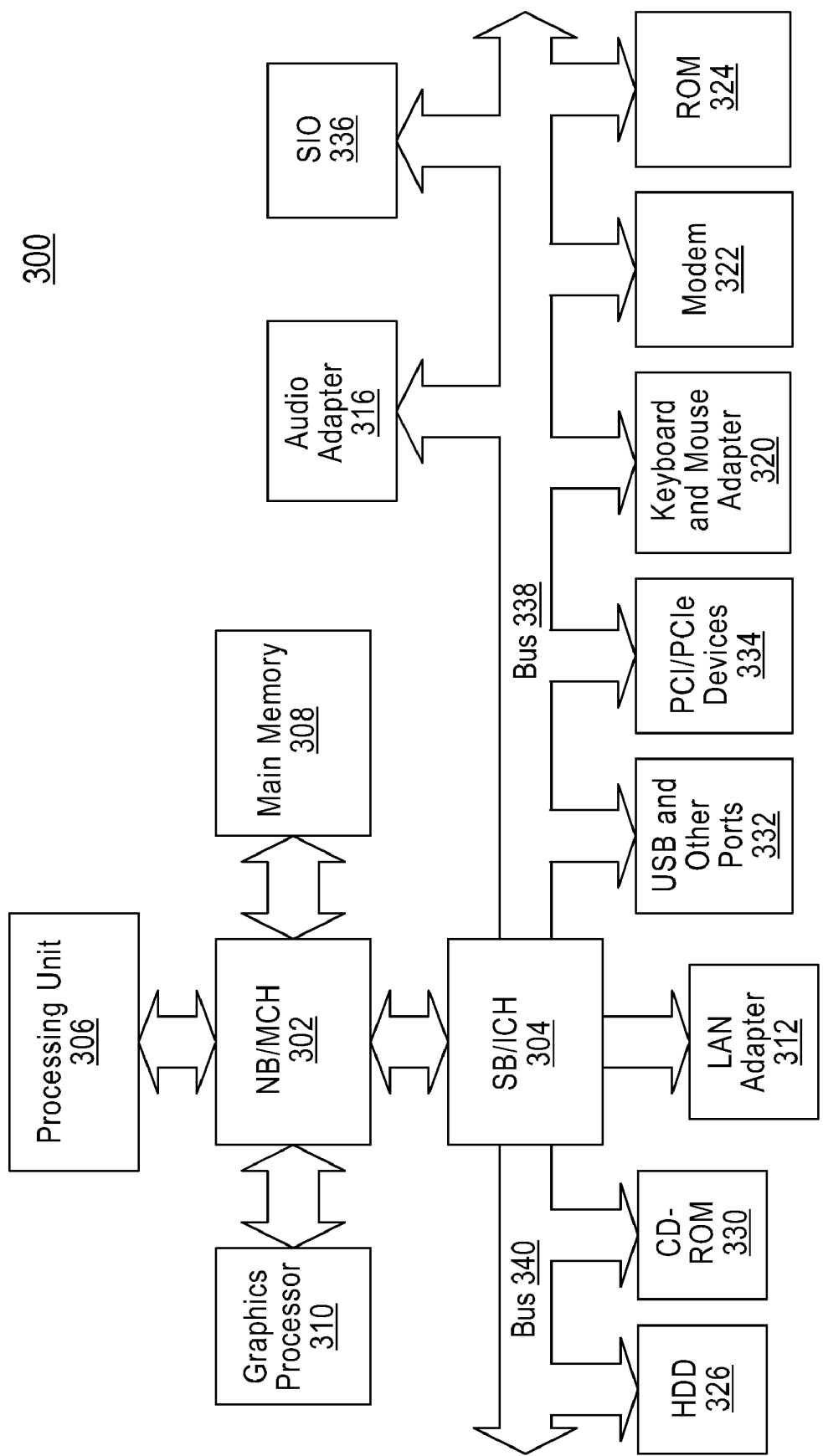
FIG. 3 is a block diagram of a data processing system in which illustrative embodiments may be implemented.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110 and 112 connect to network 102. These clients 110 and 112 may be, for example, personal computers or network computers. In the depicted example, server 104 provides data, such as boot files, operating system images, and applications to clients 110 and 112. Clients 110 and 112 are clients to server 104 in this example.

Network data processing system 100 also includes data center 114 connected to network 102. Data center 114 may be a single physical building or multiple physical buildings designed to house two or more application servers. In other words, data center 114 is a location at which two or more application servers are loosely connected to provide application services to users. Clients 110 and 112 send requests to access and/or execute an application to data center 114 through network 102. A load balancer located at data center 114 routes each request to access and/or execute an application to a selected application server. A request to access an application may be received from client 110 or 112, as well as from server 104 or 106.

For example, a request from client 110 received at data center 114 is routed by a load balancer to an application server. After execution of the application is complete, the service response or result of application execution is sent back to the requesting client from data center 114 via network 102.

In this example, network data processing system 100 includes a single data center. However, network data processing system 100 may be connected to multiple data centers. Network data processing system 100 may also include additional application servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Currently available load balancers only detect server state changes through the measurement of current server performance. A change in state of a given server is not registered until after the change in state has affected the performance of the given server to a degree that the change in performance is measurable by a performance monitor. Thus, the detection and reaction to server state changes may be slow and result in degraded application server performance for potentially lengthy periods of time.

The illustrative embodiments recognize a need for load balancers with direct awareness of server state changes to anticipate server state changes before the state change occurs or at the time the server state change occurs in an application server. In this manner, the load balancer can assign application requests to cluster servers based on more accurate server state change information to avoid degraded server performance due to state changes. In other words, the illustrative embodiments recognize the need for a load balancing feedback controller enhanced by feed-forward control for reacting to notifications of changes in the system.

Thus, the illustrative embodiments provide a computer implemented method, apparatus, and computer usable program code for load balancing in a cluster. In one embodiment, a weight adjustment value for a server is identified in response to receiving a notification of an impending state change event in the server. The weight adjustment is communicated to a load balance controller. The load balance controller generates an adjusted routing weight for the server using the weight adjustment. An incoming service request is routed to a selected server in the cluster based on the adjusted routing weight for each server in the cluster.

FIG. 2 is a block diagram of a cluster in which illustrative embodiments may be implemented. Cluster 200 is a cluster in which two or more servers are loosely coupled together to provide access to one or more applications. Cluster 200 may be a computer cluster, a server farm, web services servers, or any other group of servers coupled together to provide application services to users. Cluster 200 may be located in a data center, such as data center 114 in FIG. 1.

A client, such as client 202 or client 204, sends requests to access one or more applications on cluster 200. Clients 202 and 204 may be any type of computing device, including but not limited to, a personal computer, a laptop computer, a personal digital assistant (PDA), an iPod®, a tablet PC, or any other type of computing device. In this example, clients 202 and 204 are examples of a client, such as client 110 in FIG. 1.

Each request to access an application on the cluster is received by load balancer 206. In these embodiments, load balancer 206 is a front-end software component for managing the load on each server on the computer cluster, such as application servers 208-212.

Application servers 208-212 are any type of known or available server computers. Application servers 208-212 may be servers dedicated to executing one or more applications. Applications servers 208-212 may also be servers that perform one or more other functions in addition to hosting applications. For example, applications servers 208-212 may also function as web servers hosting web pages and/or advertising servers providing advertising content to clients 202-204 in addition to providing application services. As used herein, an application server is any server hosting an application. In these examples, an application server is not required to be a dedicated application server whose sole purpose is hosting applications.

In this illustrative embodiment, load balancer 206 uses feedback controllers and feed-forward controllers to react to performance measurements from servers in the computer cluster. Load balancer 206 is aware of server state changes before or at the time that the server state changes occur. In this manner, load balancer 206 is able to manage the load on application servers 208-212 based on current load and anticipated future load to optimize server performance and reduce application performance deterioration when server state changes occur.

With reference now to FIG. 3, a block diagram of a data processing system is shown in which illustrative embodiments may be implemented. Data processing system 300 is an example of a computer, such as server 104 or client 110 in FIG. 1 or application server 208 or client 204 in FIG. 2, in which computer usable code or instructions implementing the processes may be located for the illustrative embodiments.

In the depicted example, data processing system 300 employs a hub architecture including a north bridge and memory controller hub (MCH) 302 and a south bridge and input/output (I/O) controller hub (ICH) 304. Processing unit 306, main memory 308, and graphics processor 310 are coupled to north bridge and memory controller hub 302. Processing unit 306 may contain one or more processors and even may be implemented using one or more heterogeneous processor systems. Graphics processor 310 may be coupled to the MCH through an accelerated graphics port (AGP), for example.

In the depicted example, local area network (LAN) adapter 312 is coupled to south bridge and I/O controller hub 304 and audio adapter 316, keyboard and mouse adapter 320, modem 322, read only memory (ROM) 324, universal serial bus (USB) ports and other communications ports 332, and PCI/PCIe devices 334 are coupled to south bridge and I/O controller hub 304 through bus 338, and hard disk drive (HDD) 326 and CD-ROM drive 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be coupled to south bridge and I/O controller hub 304.

An operating system runs on processing unit 306 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300. Java and all Java-based trademarks are trademarks of Sun Microsystems, Inc. in the United States, other countries, or both.

Instructions for the operating system, the object-oriented programming system, and applications or programs are located on storage devices, such as hard disk drive 326, and may be loaded into main memory 308 for execution by processing unit 306. The processes of the illustrative embodiments may be performed by processing unit 306 using computer implemented instructions, which may be located in a memory such as, for example, main memory 308, read only memory 324, or in one or more peripheral devices.

The hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system.

In some illustrative examples, data processing system 300 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 308 or a cache such as found in north bridge and memory controller hub 302. A processing unit may include one or more processors or CPUs. The depicted examples in FIGS. 1-3 and above-described examples are not meant to imply architectural limitations. For example, data processing system 300 also may be a tablet computer, laptop computer, or telephone device in addition to taking the form of a PDA.

Figure 4A:
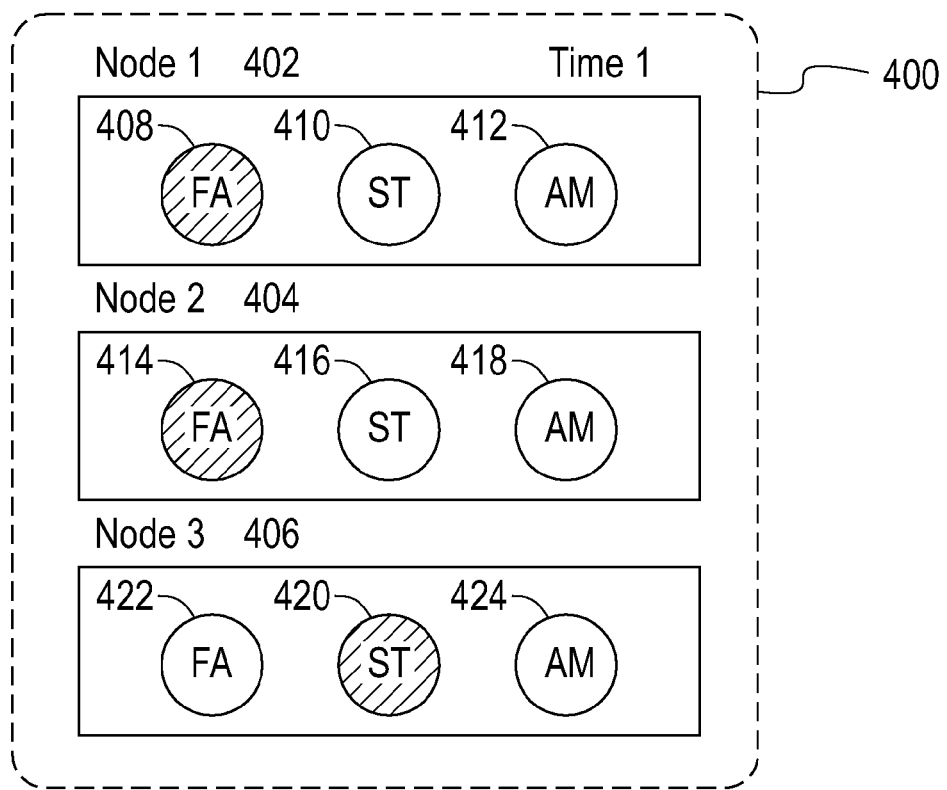
FIG. 4A is a block diagram illustrating a server state change event at a first time in accordance with an illustrative embodiment.

FIG. 4A is a block diagram illustrating a server state change event at a first time in accordance with an illustrative embodiment. Network data processing system state 400 illustrates a current state of three servers at time 1. The current states of the servers on network data processing system state 400 may be stored in a data storage device, such as storage 108 in FIG. 1. The current state of the servers may be monitored and updated by a system configuration and monitoring component associated with network data processing system state 400. The system configuration and monitoring component is discussed in more detail in FIG. 5 below.

The three servers in these example are node 1 402, node 2 404, and node 3 406. Each node has available an instance of applications FA, application ST, and application AM. At time 1, node 1 402 is not running application instance FA 408. Node 1 402 is running instances of applications ST 406 and AM 408. Node 2 404 is not running an instance of application FA 414. Node 2 404 is running instances of applications ST 416 and AM 418. Node 3 406 is not running application instance ST 420, but is running instances of applications FA 422 and AM 424.

Figure 4B:
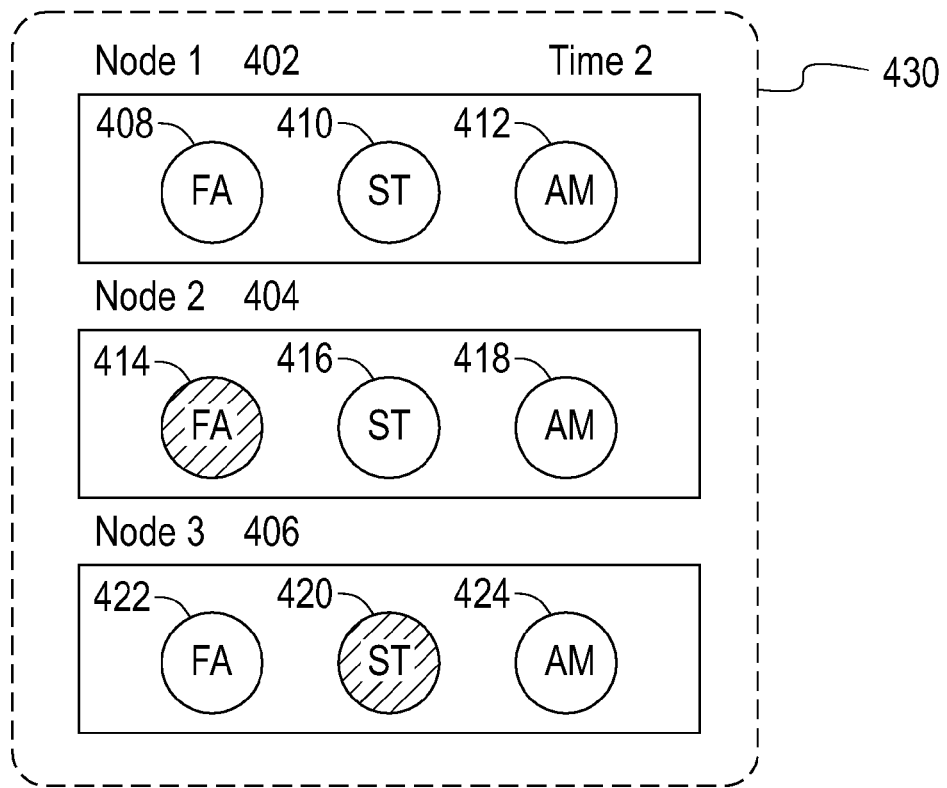
FIG. 4B is a block diagram illustrating a server state change event at a second time in accordance with an illustrative embodiment.

FIG. 4B is a block diagram illustrating a server state change event at a second time in accordance with an illustrative embodiment. Server state at time 2 430, node 1 402 begins running application instance FA 408. The change in state of node 1 402 when node 1 begins running application instance FA 408 is a state change event. A load balancer in accordance with the illustrative embodiments monitors a set of servers, such as nodes 402-406 for server state change events, such as is illustrated in FIG. 4. As used herein, a set of servers includes two or more servers.

Figure 9:
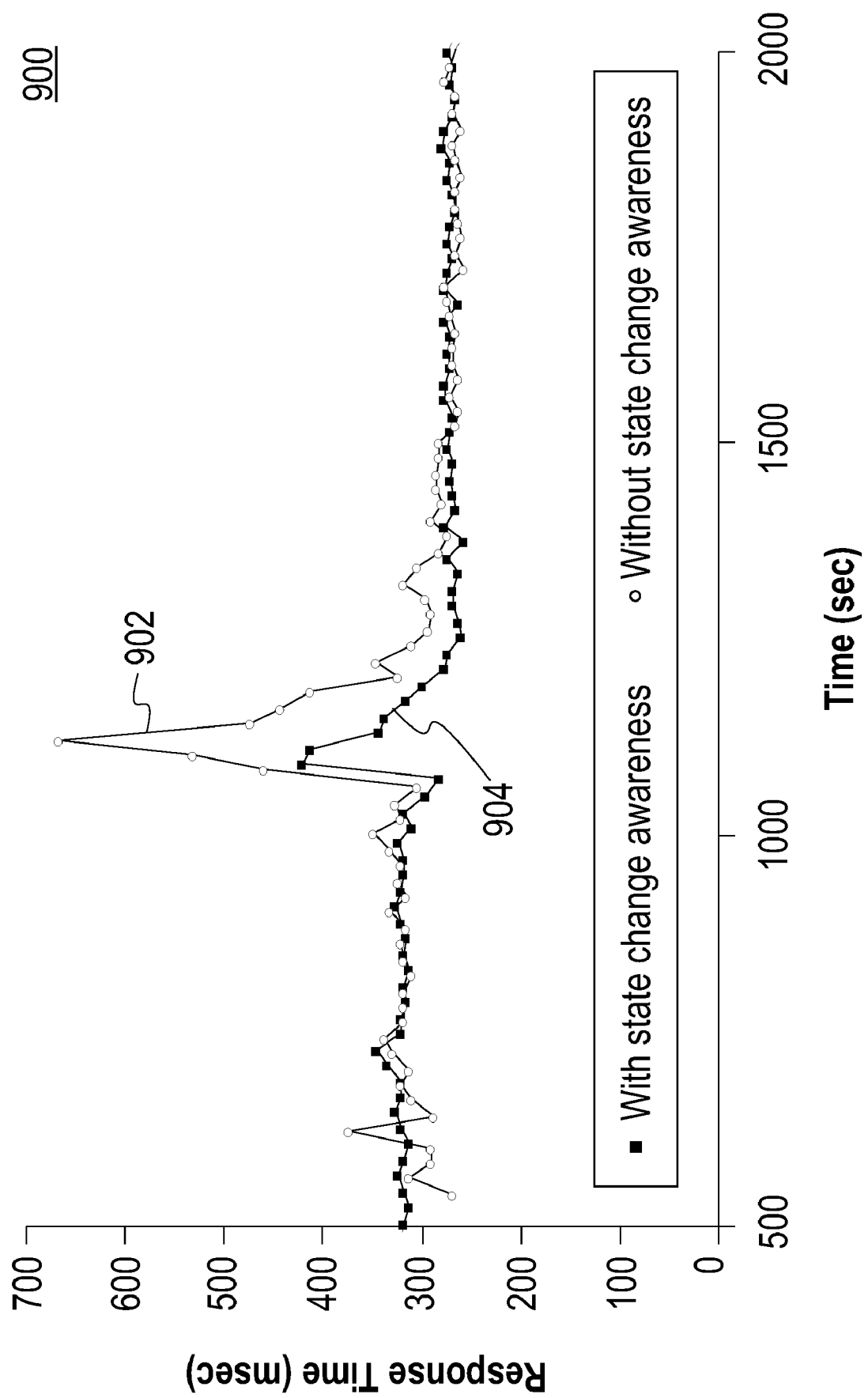
FIG. 9 is a graph illustrating performance response time for executing the account management application instance on a cluster in accordance with an illustrative embodiment.
Figure 11:
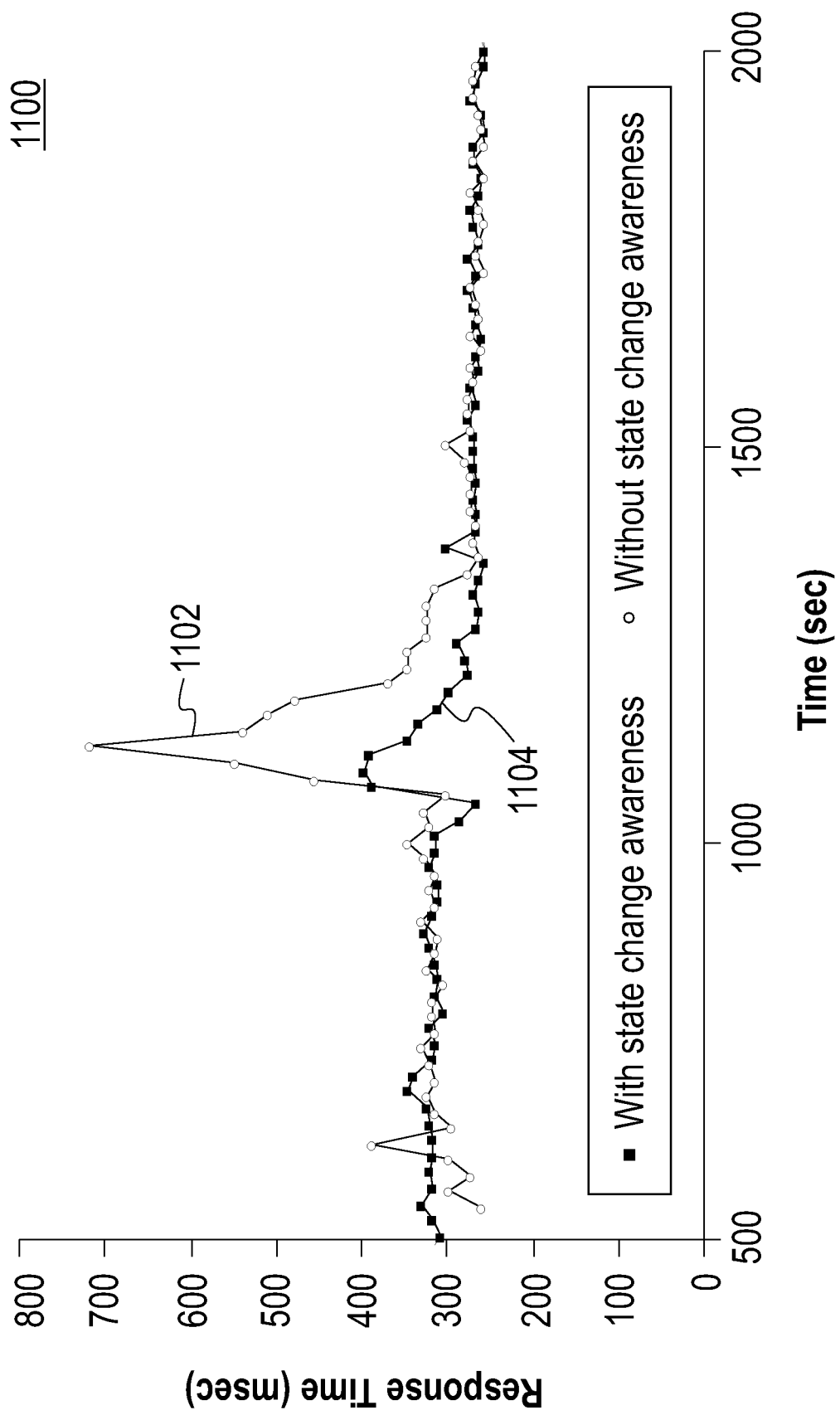
FIG. 11 is a graph illustrating a performance response time for executing the stock trade application instance on a cluster in accordance with an illustrative embodiment.
Figure 13:
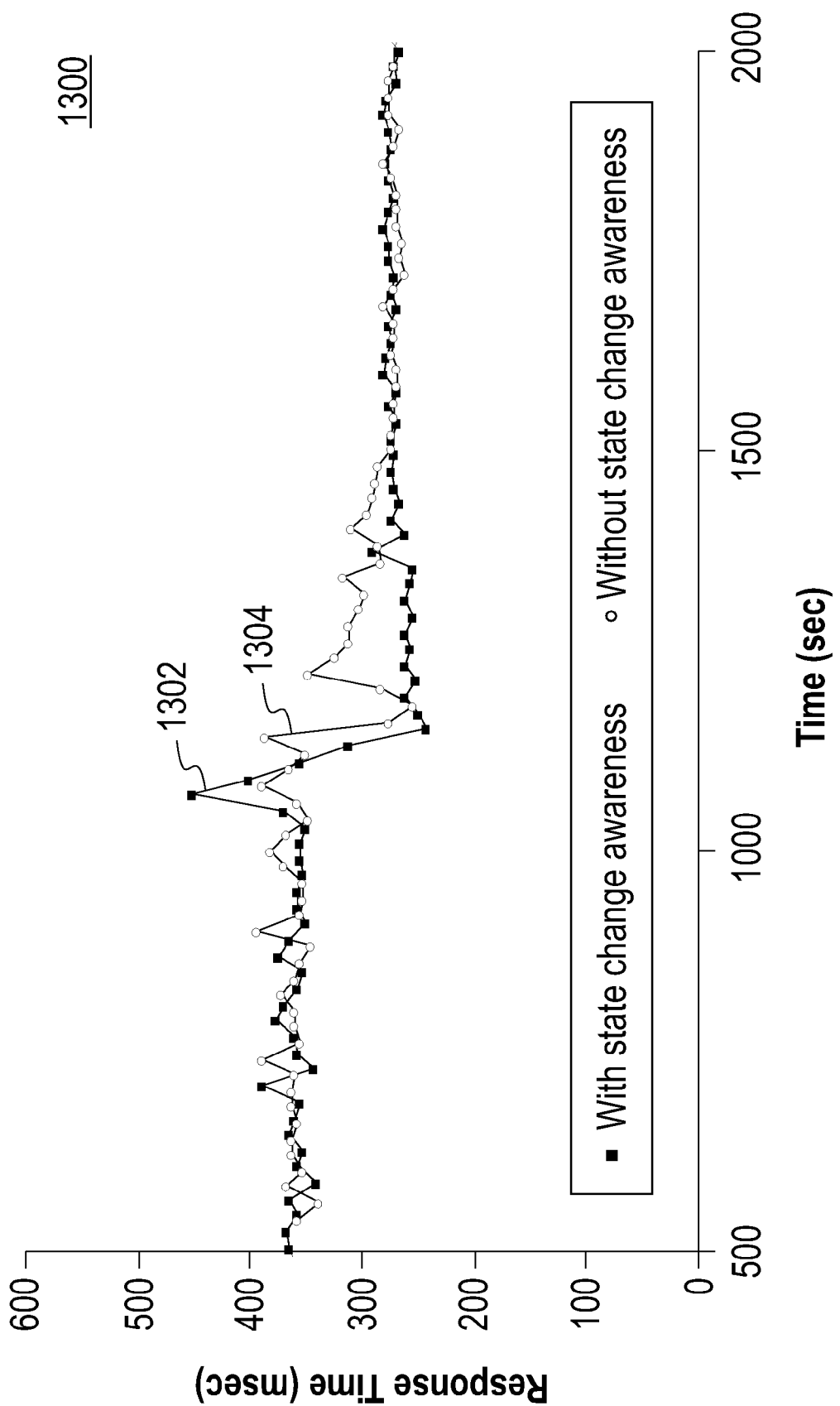
FIG. 13 is a graph illustrating an average performance response time for executing a financial application on a cluster in accordance with an illustrative embodiment.

The load balancer of the illustrative embodiments is aware of and reacts to application placement changes in a cluster, such as a server cluster. Managed server state changes are application placement changes. Events, such as server_start and server_stop, are detected through a messaging system. The load balancer uses a proportional integral derivative (PID) feedback controller to equalize the service times of requests destined to the same application. A significant performance improvement during application placement changes may be achieved using the load balancer of the illustrative embodiments, as shown in FIGS. 9, 11, and 13 below.

Figure 5:
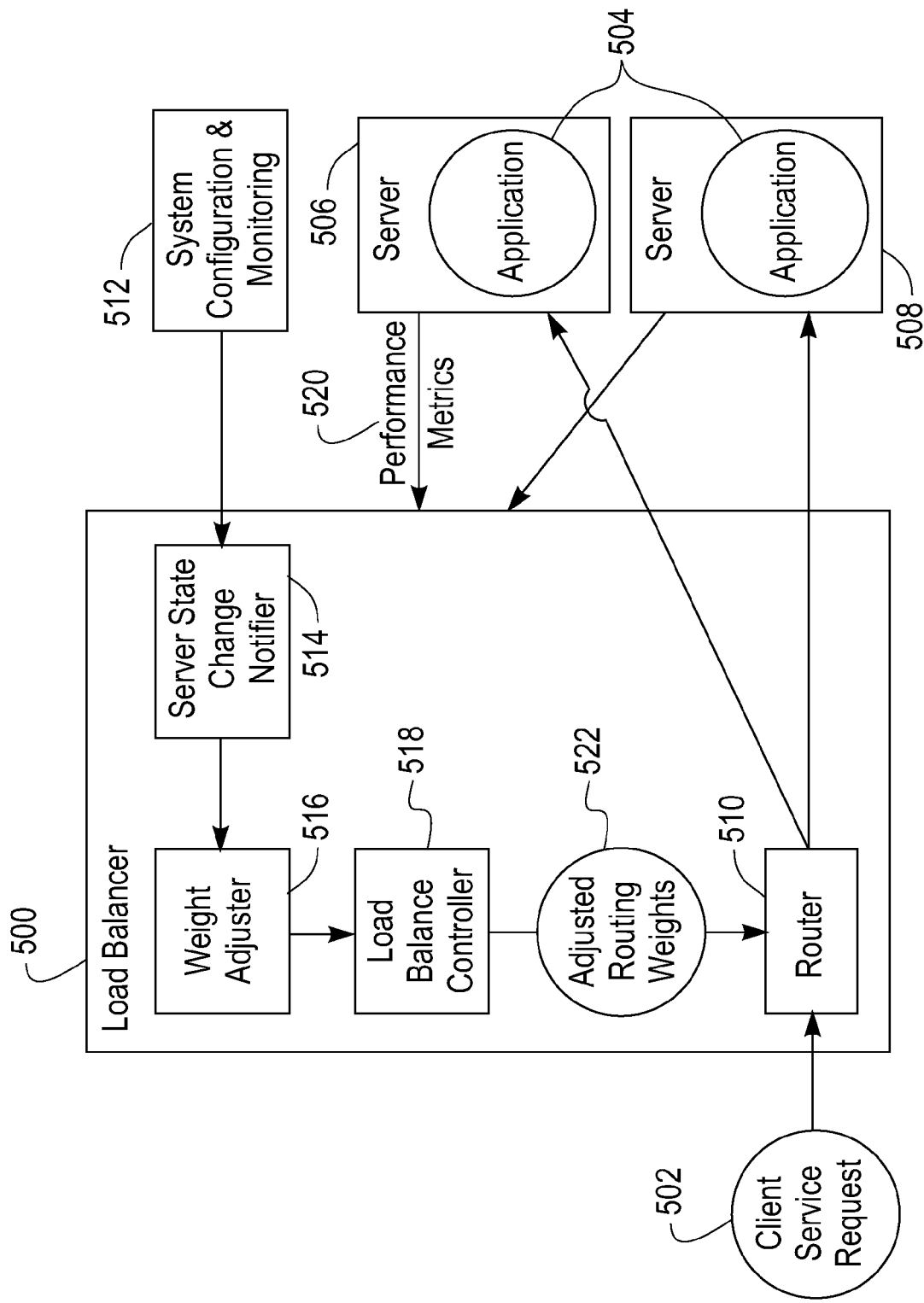
FIG. 5 is a block diagram illustrating a dataflow through a load balancer messaging system when a server state change event occurs in accordance with an illustrative embodiment.

FIG. 5 is a block diagram illustrating a dataflow through a load balancer messaging system when a server state change event occurs in accordance with an illustrative embodiment. Load balancer 500 is a front-end component for controlling and managing the loads on two or more servers. Load balancer 500 performs load balancing based on state information for the two or more servers connected to load balancer 500. Load balancer 500 may be a software component, a hardware component, or a combination of hardware and software. Load balancer Load balancer 500 may be located in a data center, such as data center 114 in FIG. 1. Load balancer 500 may be a load balancer in a cluster, such as cluster 200 in FIG. 2.

Load balancer 500 receives client service request 502 from a client, such as client 110 in FIG. 1 or client 202 in FIG. 2. Client service request 502 is a request to access an application, such as application 504. Application 504 is replicated on multiple servers in the cluster. In this example, application 504 is replicated on both server 506 and 508. In other words, in this example, there are two instances of application 504. One instance is available on server 506 and the other instance is available on server 508. Thus, client service request 502 requesting access to an instance of application 504 may be routed to either server 506 or 508.

Servers 506 and 508 are nodes in a computer cluster. Each node is a host to an application. In other words, each node provides a runtime environment for execution of applications. In this example, the computer cluster is depicted as including only two servers. However, a computer cluster may include any number of servers in accordance with the illustrative embodiments. In addition, in this example, server 506 and 508 are application servers. However, in accordance with the illustrative embodiments, the computer cluster may include any type of server, including but not limited to, an application server, a web server, a domain name server (DNS), an advertising server, or any other type of server.

In this example, servers 506 and 508 are application servers hosting one or more different applications. However, servers 506 and 508 may include two or more different applications. For example, server 506 may include an instance of application A, application B, and application C. Server 508 may include an instance of application A, application C, and application D. Thus, each server is not required to include the same applications as any other server in the cluster. However, in another embodiment, all the servers in the cluster could include an identical set of applications.

Client service request 502 is sent to router 510. Router 510 is software component for handling message transfers between computing devices. In this example, router 510 is a component for routing application requests, such as client service request 502, to servers on the cluster associated with load balancer 500.

System configuration and monitoring 512 is a software component for monitoring the configuration of the network data processing system on which the computer cluster is located. The configuration is the arrangement of computing devices in the network data processing system. The configuration includes the hardware, software, firmware, and/or documentation associated with the network data processing system. The configuration includes an identification of which application are located on which servers. The configuration also includes the processing speed of each server.

System configuration and monitoring 512 also monitors changes in the network data processing system. For example, system configuration and monitoring 512 monitors background processes, new applications that begin execution, application instances that stop execution, and any other information regarding a current state of servers 506 and 508.

The system state information gathered by system configuration and monitoring 512 is sent to server state change notifier 514. Server state change notifier 514 is a software component for determining if a change in load balance is needed based on the current configuration and state changes in the given server. For example, when an instance of application 504 begins running on server 506, the execution of application 504 places a heavy load on the resources of server 506. In other words, server 506 will be less able to perform other tasks due to the drain on the processor, memory, and other resources of server 506 that may be expended to execute application 504. Therefore, server state change notifier 514 makes a determination as to whether or not additional tasks or application requests should be routed to server 506 while application 504 is still executing. Server state change notifier 514 may determine that application 504 will take approximately one and a half minutes to complete execution. Consequently, server state change notifier 514 will decide if service requests should not be routed to server 506 during that one and a half minute time period during which application 504 is executing.

Server state change notifier 514 sends a notification of the state change event to weight adjuster 516 notifying weight adjuster 516 as to whether an adjustment in the routing weights for servers 506 and 508 are needed. Routing weights are the weights or factors used to determine which server should receive a client service request. For example, if the computer cluster includes three nodes, the routing weights could indicate that fifteen percent (15%) of incoming service requests should be sent to node 1, forty-five percent (45%) of service requests should be sent to node 2, and forty percent (40%) of incoming service requests should be sent to node 3.

Weight adjuster 516 calculates an adjustment to a routing weight for a given node based on state changes in each node either before the changes occur or at the time the changes occur. Weight adjuster 516 sends the routing weight adjustment to load balance controller 518. Load balance controller 518 adjusts the routing weight for each node based on the routing weight adjustment for each node received from weight adjuster 516.

Thus, if server 508 begins running an instance of application 504, this change in the state of server 508 may result in weight adjuster 516 sending a weight adjustment to load balance controller 518 to lower the routing weight for server 508 so that router 510 will route fewer incoming service requests to server 508. When the instance of application 504 stops or completes execution, weight adjuster 516 may send an adjustment to load balance controller 518 to raise the routing weight for server 508 so that router 510 will route more incoming service requests to server 508.

Performance metrics 520 are measurements obtained from each node regarding the performance of the node. The performance of the node includes the amount of time required for each node to complete a task or execution of an application. Performance metrics 520 are sent from servers 506 and 508 to load balancer 500 for use in determining the current performance of servers 506 and 508.

Load balance controller 518 is a software component for controlling the amount of load or client service requests routed to each server. Load balance controller 518 uses routing weight adjustments from weight adjuster 516 and performance metrics 520 to adjust or update the routing weights for each node. Load balance controller 518 sends adjusted routing weights 522 to router 510.

Thus, in this example shown in FIG. 5, the process begins when a client sends client service request 502 to access an instance of application 504 on the computer cluster. Load balancer 500 receives client service request 502 and sends the request to router 510. Router 510 receives adjusted routing weights 522 from load balance controller 518. In this example, adjusted routing weights 522 indicates fifty-five percent (55%) of incoming requests should be routed to server 508 and forty-five (45%) of incoming requests should be routed to server 506. Router 510 selects server 508 in the computer cluster to route client service request 502 based on adjusted routing weights 522 for server 506 and 508. Server 508 executes an instance of application 504 in response to receiving client service request 502 from router 510.

System configuration and monitoring 512 monitors the new instance of application 504. System configuration and monitoring 512 sends system state change data to server state change notifier 515 indicating that a new application instance is running on server 508. Server state change notifier 516 determines that a change in load balance on server 506 and 508 is needed in response to the change in state that occurred as a result of server 508 executing a new instance of application 505.

Server state change notifier 516 sends state change event information to weight adjuster 518. Weight adjuster 518 calculates a weight adjustment for the routing weights of server 506 and 508. Weight adjuster 516 sends the weight adjustments to load balance controller 518. Load balance controller 518 receives the weight adjustments from weight adjuster 516. Load balance controller 518 also receives performance metrics 520 indicating the current performance of servers 506 and 508. Based on the weight adjustments and current performance metrics, load balance controller 518 sends adjusted routing weights 522 to router 510. For example, adjusted routing weights 522 may indicate that only forty percent (40%) of incoming service requests should now be routed to server 508. Thus, if a new service request is received, router 510 may route the new service request to server 506 rather than server 508 based on the new routing weights.

In this example, system configuration and monitoring 512, server state change notifier 514, and weight adjuster 516 forms a feed-forward controller that adjusts routing weights based on changes in state of one or more servers before the change in state occurs or as the state in change is occurring. Load balance controller 518 and router 510 form a feedback controller that controls and adjusts server loads based on feedback performance metrics and feed-forward state change information. Feedback performance metrics indicate current changes in performance in each server as a result of changes in server state that have already occurred and resulted in server performance either improving or deteriorating. In other words, feedback control measures changes after a change in state has affected the given server's performance. Feed-forward state change information monitors changes in server state before or at the time the change in state occurs. Feed-forward state change information can be obtained before the state change affects performance. Thus, weight adjuster 516 can calculate a weight adjustment that takes into account an increased load on server 508 before the processing performance of server 508 begins to deteriorate or slow. Thus, load balancer 500 can control routing weights to compensate for changes in state based on feed-forward state changes and feedback performance metrics indicating changes in server state. In this manner, load balancer 500 can optimize server performance.

In this example, components 510-522 are located on a single hardware device. However, in accordance with the illustrative embodiments, components 510-522 may be located on one or more hardware devices. In addition, one or more of components 510-522 may be located on a server in the cluster, such as servers 506 and 508.

Figure 6:
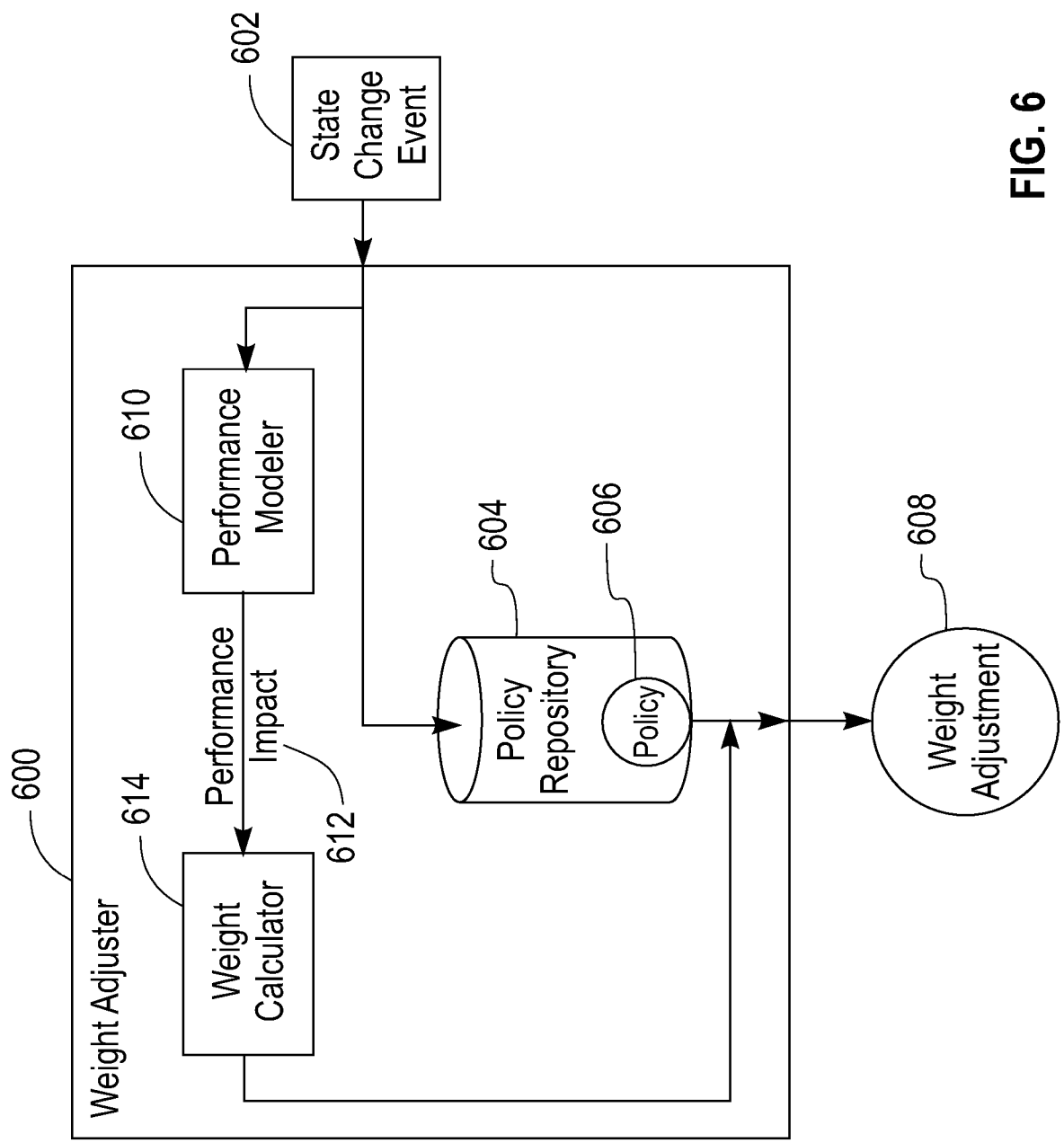
FIG. 6 is a block diagram illustrating a weight adjuster in accordance with an illustrative embodiment.

Turning now to FIG. 6, a block diagram illustrating a weight adjuster is depicted in accordance with an illustrative embodiment. Weight adjuster 600 is a component for calculating a routing weight adjustment based on state change event information in a network data processing system. Weight adjuster 600 is a weight adjuster, such as weight adjuster 516 in FIG. 5.

Weight adjuster 600 receives state change event 602 information from a server state change notifier, such as server state change notifier 514 in FIG. 5. State change event 602 is an event that changes a state of a server, such as beginning execution of an application and/or ending execution of an application. In other words, state change event 602 is an event that may affect the performance of a server. Thus, weight adjuster 600 needs to be made aware of state change event 602 to calculate a weight adjustment and balance the load on each server to optimize server performance.

A state change may be associated with a policy. A policy associated with a state change specifies a weight adjustment to be made in response to the state change. The policy is a predetermined or pre-generated set of parameters, protocols, rules, and/or formulas for calculating a weight adjustment for a given state change event. For example, if a business application "X" is executed on a given server, a policy associated with the state change event for executing business application "X" is associated with a policy, the policy could specify a downward weight adjustment of ten percent (10%) for the given server on which the state change event took place.

Weight adjuster 600 makes a determination as to whether state change event 602 is associated with a policy by checking policy repository 604 for policy 606 associated with state change event 602. In response to locating policy 606, weight adjuster 600 calculates weight adjustment 608 based on the weight adjustment parameters included in policy 606.

However, if weight adjuster 600 cannot locate a policy associated with state change event 602, performance modeler 610 makes a determination as to the predicted impact of state change event 602. Performance modeler 610 includes a set of one or more models of the network data processing system in which weight adjuster 600 is a part. The set of models include information regarding the current network data processing system configuration, the number of applications on each server, the processor speeds of each server, and/or any other data regarding the data processing system configuration. The set of models is used to determine performance impact 612 of server state change event 602 on the network data processing system.

Performance impact 612 is information regarding the predicted impact of state change event 602 on one or more servers in the network data processing system. For example, performance impact 612 could include information predicting a decrease in processor performance in node 1 and/or an increase in processor performance in node 2 as a result of state change event 602.

Performance impact 612 is sent to weight calculator 614. Weight calculator 614 calculates a weight change or weight adjustment that should be made to a routing weight for one or more nodes in the data processing system based on performance impact 612. In this example, weight calculator 614 may be implemented as any type of known or available software component for calculating a routing weight adjustment based on performance impact data associated with a state change in one or more servers. Weight calculator 614 calculates weight adjustment 608. Weight adjustment 608 is sent to a component for generating an adjusted routing weight for one or more nodes based on weight adjustment 608, such as load balance controller 518 in FIG. 5.

Figure 7:
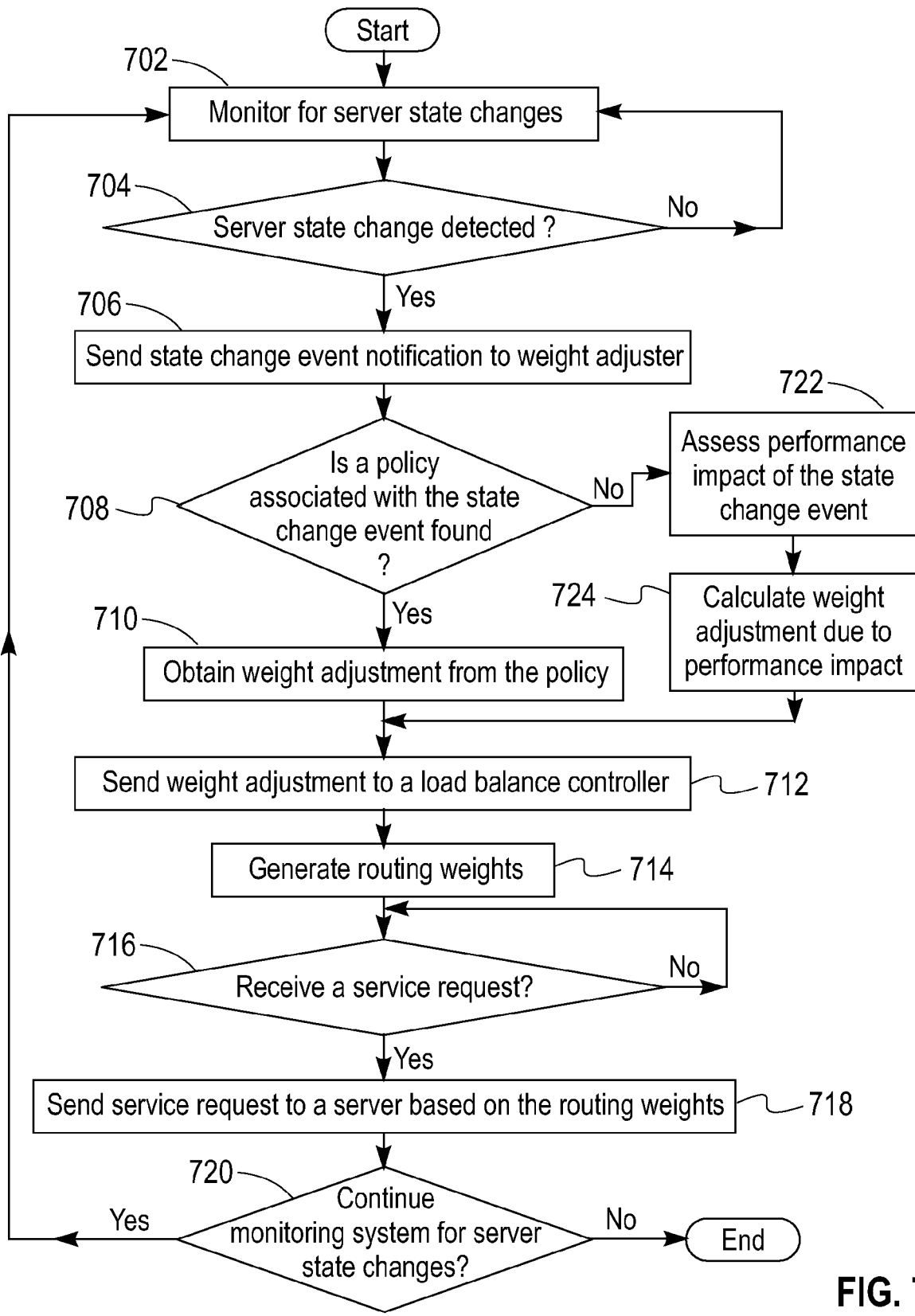
FIG. 7 is a flowchart illustrating a process for a load balancer with feedback and feed-forward server state change awareness in accordance with an illustrative embodiment.

FIG. 7 is a flowchart illustrating a process for a load balancer with feedback and feed-forward server state change awareness in accordance with an illustrative embodiment. The process in FIG. 7 is performed by a software and/or hardware component for managing loads on a set of servers based on server state information. In this example, the process is performed by a load balancer, such as load balancer 500 in FIG. 5.

The process begins by monitoring for server state changes in a set of servers (step 702). The process makes a determination as to whether a server state change is detected (step 704). If a server state change is not detected, the process returns to step 702 until a server state change in one or more servers is detected. When a server state change is detected in step 704, the process sends a state change event notification to a weight adjuster (step 706). The process makes a determination as to whether a policy associated with the state change event is found (step 708). If a policy is found, the process obtains a weight adjustment from the policy (step 710). The process sends the weight adjustment to a load balance controller (step 712), such as load balance controller 518 in FIG. 5. The process generates routing weights for one or more servers in the set of servers based on the weight adjustments (step 714).

Next, the process makes a determination as to whether a service request is received from a user (step 716). If a service request is not received, the process returns to step 716 until a service request is received. When a service request is received at step 716, the process sends the service request to a server based on the routing weights for the set of servers (step 718). The process then makes a determination as to whether to continue monitoring the network data processing system for server state changes (step 720). If a determination is made to continue monitoring for server state changes, the process returns to step 702. However, if a determination is made to discontinue monitoring for server state changes at step 720, the process terminates thereafter.

Returning now to step 708, if a policy associated with the server state change event is not found, the process assess a performance impact of the state change event (722). Next, the process calculates a weight adjustment due to the performance impact (step 724). The process then sends the weight adjustment to a load balance controller (step 712), such as load balance controller 518 in FIG. 5. The process generates routing weights for one or more servers in the set of servers based on the weight adjustments (step 714). The process makes a determination as to whether a service request is received from a user (step 716). If a service request is not received, the process returns to step 716 until a service request is received. When a service request is received at step 716, the process sends the service request to a server based on the routing weights for the set of servers (step 718). The process then makes a determination as to whether to continue monitoring the network data processing system for server state changes (step 720). If a determination is made to continue monitoring for server state changes, the process returns to step 702. However, if a determination is made to discontinue monitoring for server state changes at step 720, the process terminates thereafter.

Figure 8:
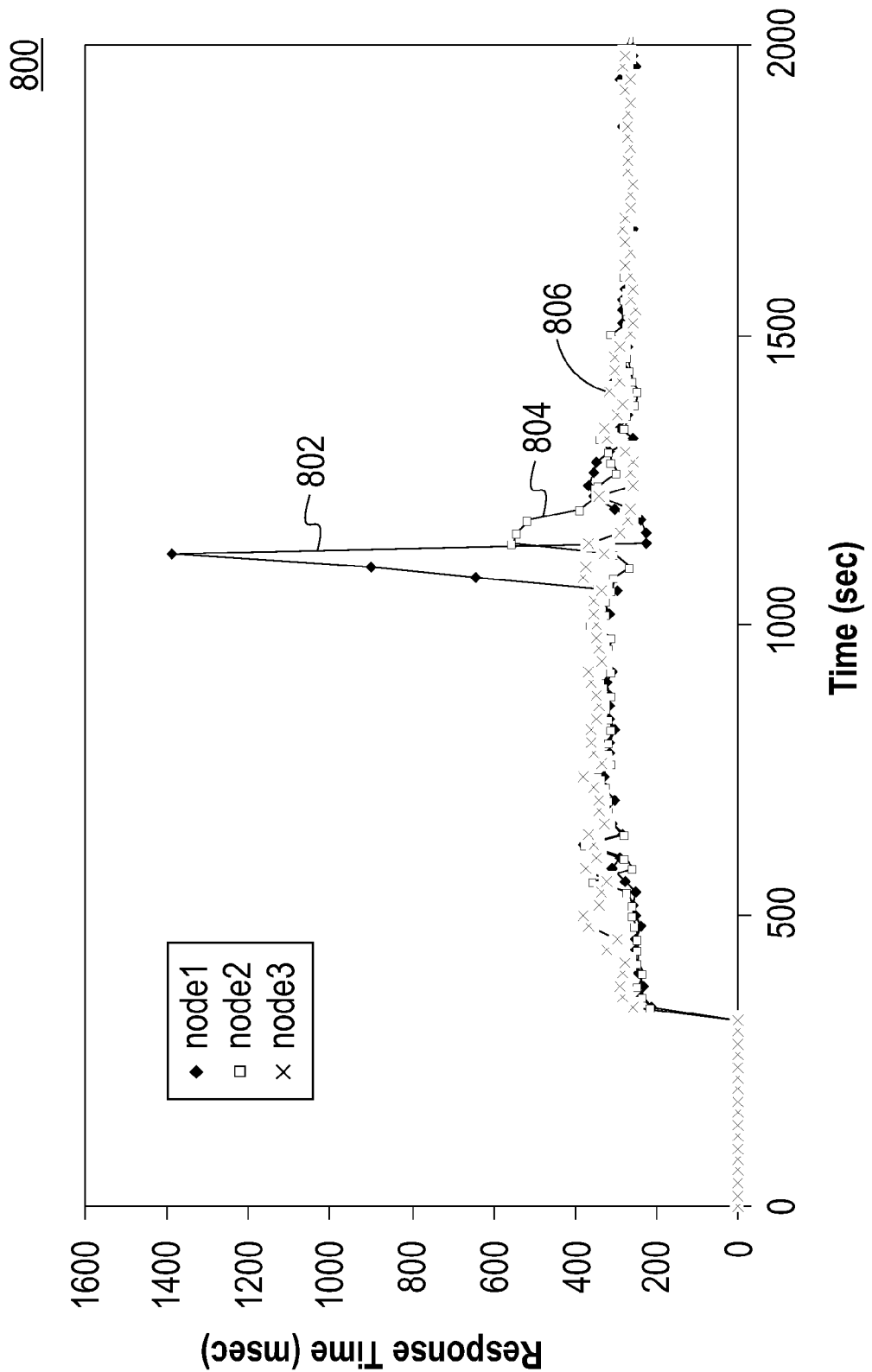
FIG. 8 is a graph illustrating a prior art performance response time for executing an account management application instance on a cluster.

FIG. 8 is a graph illustrating a prior art performance response time for executing an account management application instance on a cluster. Graph 800 is illustrating a performance response time for an application instance AM executing on nodes 402-406 in FIG. 4 when a currently available load balancer is used to route service requests to servers.

Line 802 is illustrating the performance of node 1 402 in FIG. 4 when server state change event occurs. As discussed above, the server state change was an instance of application FA 408 that began running on node 1 402. Line 804 illustrates the performance of node 2 404 when the server state change occurred on node 1 402 in FIG. 4. Line 806 illustrates the performance of node 3 406 when the server state change occurred in node 1 402 in FIG. 4. As can be seen in graph 800 in FIG. 8, when an instance of application FA begins running in node 1 at approximately time 1100, the performance of application instance AM in node 1 begins to deteriorate dramatically in comparison to the performance of application instance AM on nodes 2 and 3 shown in lines 804 and 806.

Turning now to FIG. 9, a graph illustrating performance response time for executing the account management application instance on a cluster is shown in accordance with an illustrative embodiment. Graph 900 illustrates an average performance response time for an application instance AM executing on nodes 402-406 in FIG. 4. Line 902 shows the average performance response time in the set of nodes when a prior art load balancer is used. Line 904 shows an average performance response time when a load balancer with state change awareness, in accordance with the illustrative embodiments, is used to route service requests. As can be seen, when the instance of application FA begins executing at approximately time 1100, the average response time for executing application instance AM shown in line 904 remains more constant and shows a shorter average response time than the prior art load balancer.

Figure 10:
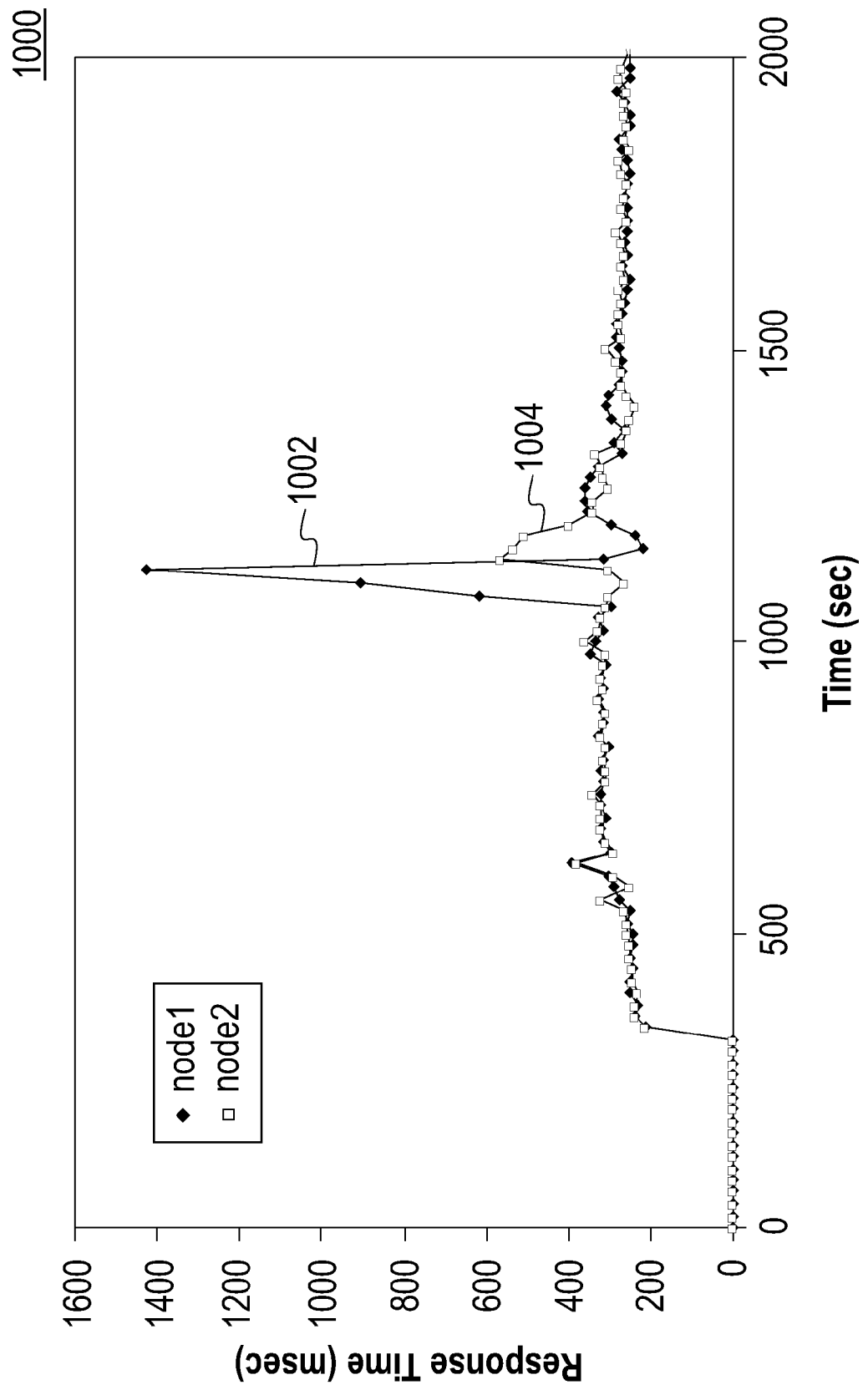
FIG. 10 is a graph illustrating a prior art performance response time for executing a stock trade application instance on a cluster.

FIG. 10 is a graph illustrating a prior art performance response time for executing a stock trade application instance on a cluster. Graph 1000 is illustrating a performance response time for an application instance ST executing on nodes 402 and 404 in FIG. 4 when a currently available load balancer is used to route service requests to servers.

Line 1002 is illustrating the performance of node 1 402 in FIG. 4 when a server state change event occurs. As discussed above, the server state change was an instance of application FA 408 that began running on node 1 402. Line 1004 illustrates the performance of node 2 404 when the server state change occurred on node 1 402 in FIG. 4. As can be seen in graph 1000 in FIG. 10, when an instance of application FA begins running in node 1 at approximately time 1100, the performance of application instance ST in node 1 begins to deteriorate dramatically in comparison to the performance of application instance ST on node 2 shown in line 1004.

FIG. 11 is a graph illustrating a performance response time for executing the stock trade application instance on a cluster in accordance with an illustrative embodiment. Graph 1100 illustrates an average performance response time for an application instance ST executing on nodes 402 and 404 in FIG. 4. Line 1102 shows the average performance response time in the set of nodes when a prior art load balancer is used. Line 1104 shows an average performance response time when a load balancer with state change awareness, in accordance with the illustrative embodiments, is used to route service requests. As can be seen, when the instance of application FA begins executing at approximately time 1100, the average response time for executing application instance ST shown in line 1104 shows a shorter average response time than the prior art load balancer.

Figure 12:
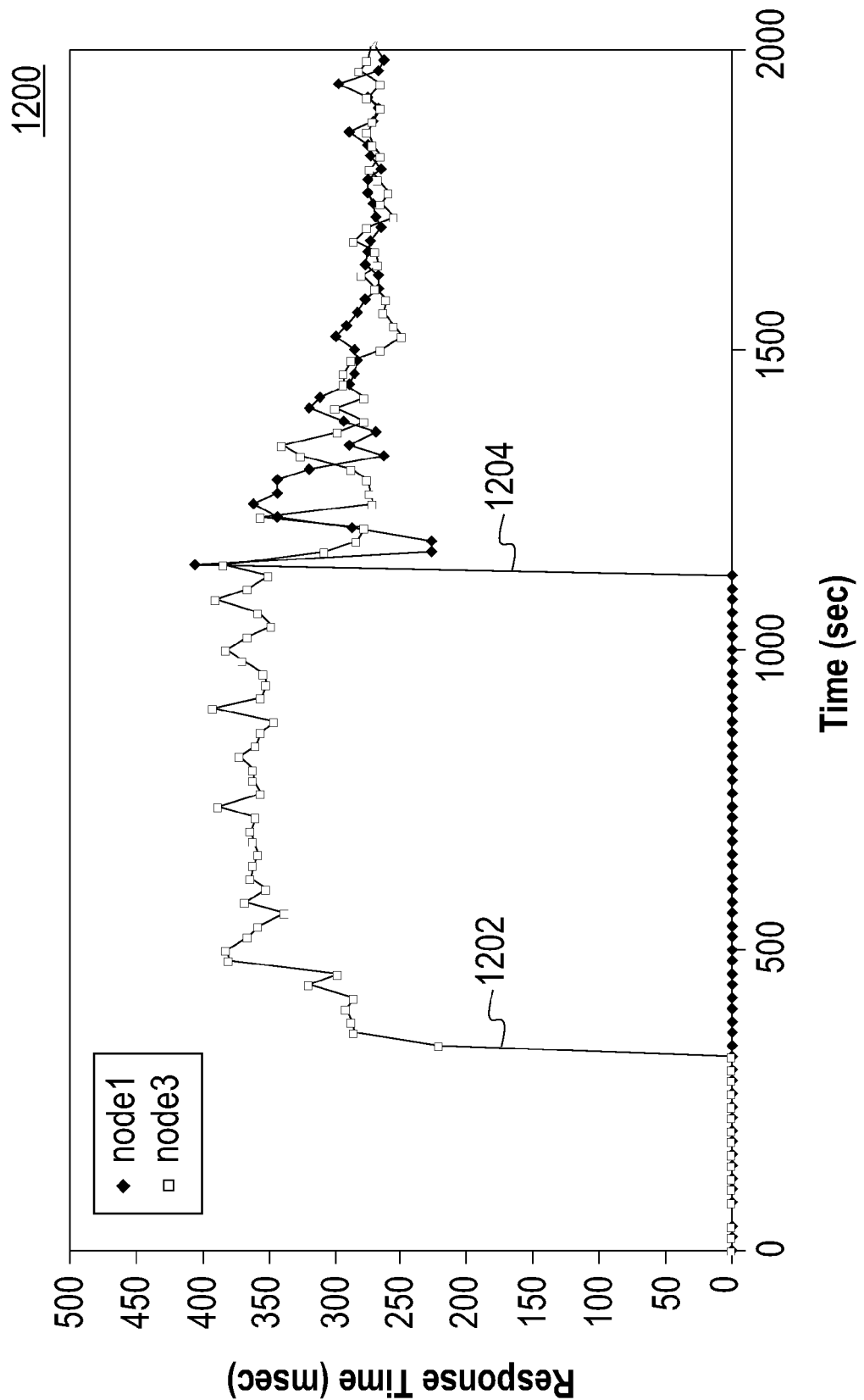
FIG. 12 is a graph illustrating a prior art performance response time for executing a financial application on a cluster.

FIG. 12 is a graph illustrating a prior art performance response time for executing a financial application on a cluster. Graph 1200 is illustrating a performance response time for an application instance FA executing on nodes 402 and 406 in FIG. 4 when a currently available load balancer is used to route service requests to servers.

Line 1202 is illustrating the performance of node 1 402 in FIG. 4 when a server state change event occurs. As discussed above, the server state change is an instance of application FA 408 starting to execute on node 1 402. Line 1204 illustrates the performance of node 3 406 when the server state change occurred on node 1 402 in FIG. 4. As can be seen in graph 1200 in FIG. 12, when an instance of application FA begins running in node 1 at approximately time 1100, the performance of application instance FA in node 1 begins to deteriorate dramatically in comparison to the performance of application instance FA running on node 2 shown in line 1204.

Referring now to FIG. 13, a graph illustrating an average performance response time for executing a financial application on a cluster is shown in accordance with an illustrative embodiment. Graph 1300 illustrates an average performance response time for an application instance FA executing on nodes 402 and 406 in FIG. 4 when a state change event occurs. Line 1302 shows the average performance response time in the set of nodes when a prior art load balancer is used. Line 1304 shows an average performance response time when a load balancer with state change awareness in accordance with the illustrative embodiments is used to route service requests. As can be seen, when the instance of application FA begins executing at approximately time 1100, the average response time for executing application instance FA across all nodes currently executing application FA shows a shorter or faster average response time than the prior art load balancer, as can be seen in shown in line 1304. In other words, the illustrative embodiments can equalize the average service performance time for service requests destined to the same application across a server cluster.

Thus, the illustrative embodiments detect the change in state before the peak in line 1302 indicating a decrease in performance. The illustrative embodiments detect the change through feedback and feed-forward control and adjust routing weights for the servers to compensate for the anticipated performance impact on the servers. Thus, line 1304 showing the average performance in the nodes using a load balancer, in accordance with the illustrative embodiments, does not show a peak slow down in response time as in the prior art method. Rather, the illustrative embodiments avoid the performance declines by adjusting routing weights to maintain processing performance in all nodes closer to the mean or average response time.

Thus, the illustrative embodiments provide a computer implemented method, apparatus, and computer usable program code for load balancing in a computer cluster. In one embodiment, a weight adjustment value for a server is identified in response to receiving a notification of an impending state change event in the server. The weight adjustment is communicated to a load balance controller. The load balance controller generates an adjusted routing weight for the server using the weight adjustment. An incoming service request is routed to a selected server in the cluster based on the adjusted routing weight for each server in the cluster.

Thus, the illustrative embodiments provide direct awareness of load balancers of server state changes in a computer data center. Load balancers use feedback controllers for reacting to performance measurements from the set of servers in the data center. The load balancer is also aware of feed-forward server state changes. Thus, managed server state changes are communicated to the load balancer directly from the appropriate manager ahead of the time of the server state change event or at the time of the server state change event.

The load balancer also detects events from the messaging system. This allows the load balancer to be provided with information about managed server state changes, such as duration and performance impact estimation. The load balancer is able to specify load change policies corresponding to the server state change events, such as decreasing traffic to a given server by fifty percent (50%) when a new application starts running on that server and/or increase traffic by twenty percent (20%) to a server when an application completes execution on that server. The load balancer also includes a load balance controller to implement load change policies after the weights are computed by a weight adjuster feedback controller in the load balancer.

In this manner, the illustrative embodiments use feedback and feed-forward control to equalize the service times of requests destined to the same application. As shown in FIGS. 8-13, a significant performance improvement during application placement changes can be achieved when using the improved load balancer of the illustrative embodiments.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for load balancing in a cluster, the computer implemented method comprising:
    responsive to receiving notification of an impending state change event in a server in the cluster, identifying a weight adjustment value for the server to form an identified weight adjustment;
    generating an adjusted routing weight for the server using the identified weight adjustment to form a current routing weight for the server; and
    routing an incoming service request to a selected server in the cluster using current routing weights associated with servers in the cluster.

2. The computer implemented method of claim 1 wherein identifying a weight adjustment for the server further comprises:
    retrieving the weight adjustment value from a policy associated with the state change event.

3. The computer implemented method of claim 1 wherein identifying a weight adjustment for the server further comprises:
    assessing a performance impact of the state change event using a configuration model for the cluster.

4. The computer implemented method of claim 3 further comprising:
    calculating the weight adjustment value using the performance impact.

5. The computer implemented method of claim 1 further comprising:
    monitoring a set of servers for a state change; and
    responsive to detecting the state change, sending a notification of the state change event to a weight adjuster.

6. The computer implemented method of claim 3 wherein the adjusted routing weight is generated based on the performance impact the state change event will have on a set of servers in the cluster before the state change event occurs.

7. The computer implemented method of claim 1 further comprising:
    communicating the identified weight adjustment to a load balance controller for use in generating the adjusted routing weight.

8. The computer implemented method of claim 1 further comprising:
    identifying a weight adjustment value for each server in the cluster to form an identified weight adjustment; and
    calculating an adjusted routing weight for each server in the cluster based on the identified weight adjustment for each server to form a current routing weight for each server.

9. A computer program product comprising:
    a computer usable medium including computer usable program code for load balancing in a cluster, said computer program product comprising:
    computer usable program code for responsive to receiving notification of an impending state change event in a server, identifying a weight adjustment value for the server to form an identified weight adjustment;
    computer usable program code for generating an adjusted routing weight for the server using the identified weight adjustment to form a current routing weight for the server; and
    computer usable program code for routing an incoming service request to a selected server in the cluster using current routing weight associated with servers in the cluster.

10. The computer program product of claim 9 further comprising:
    computer usable program code for retrieving the weight adjustment value from a policy associated with the state change event.

11. The computer program product of claim 9 further comprising:
    computer usable program code for assessing a performance impact of the state change event using a configuration model for the cluster.

12. The computer program product of claim 11 further comprising:
    computer usable program code for calculating the weight adjustment value using the performance impact.

13. An apparatus comprising:
    a bus system;
    a communications system connected to the bus system;
    a memory connected to the bus system, wherein the memory includes computer usable program code; and
    a processing unit connected to the bus system, wherein the processing unit executes the computer usable program code to responsive to receive notification of an impending state change event in a server, identify a weight adjustment value for the server to form an identified weight adjustment; generate an adjusted routing weight for the server using the identified weight adjustment to form a current routing weight for the server; and route an incoming service request to a selected server in the cluster using current routing weight associated with servers in the cluster.

14. The apparatus of claim 13 wherein the processor unit further executes the computer usable program code to assess a performance impact of the state change event using a configuration model for the cluster and calculate the weight adjustment value using the performance impact.

15. The apparatus of claim 13 wherein the processor unit further executes the computer usable program code to retrieve the weight adjustment value from a policy associated with the state change event.

16. A load balancer, the load balancer comprising:
a state change notifier for providing notice of an impending state change event in a server;
a weight adjuster, wherein the weight adjuster identifies a weight adjustment value for the server to form an identified weight adjustment;
a load balance controller, wherein the load balance controller generates an adjusted routing weight for the server using the identified weight adjustment to form a current routing weight for the server; and
a router, wherein the router routes an incoming service request to a selected server in the cluster using current routing weight associated with servers in the cluster.

17. The load balancer of claim 16 further comprising:
a system configuration and monitoring component for monitoring a set of servers for state change events.

18. The load balancer of claim 16 further comprising:
a policy repository for storing a set of policies associated with one or more state change events.

19. The load balancer of claim 16 further comprising:
a performance modeler for assessing a performance impact of the impending state change event using a configuration model for the cluster.

20. The load balancer of claim 19 further comprising:
a weight calculator for calculating the weight adjustment value using the performance impact.

* * * * *